United States Patent Office.

BENOIT BLOCH, OF SOULTZ, FRANCE.

Letters Patent No. 79,942, dated July 14, 1868.

IMPROVED ANILINE DYE.

*The Schedule referred to in these Letters Patent and making part of the same.*

TO ALL WHOM IT MAY CONCERN:

Be it known that I, BENOIT BLOCH, of Soultz, in the department of Haut-Rhine, France, have invented a new and useful Improvement in Aniline Dye; and I do hereby declare that the following is a full, clear, and exact description thereof, which will enable others skilled in the art to make and use the same.

This invention relates to a new and improved gray dye, prepared from aniline-oil, as follows: I take aniline-oil, by weight, five parts, arsenic acid, in liquid form and about seventy-five degrees strength, five parts.

The substances are mixed and boiled for about two hours, more or less, according to the quantity of the mixture being prepared, until the latter becomes quite thick, or concentrated as much as possible. The vessel containing the mixture is then removed from the fire and allowed to cool, the mixture, as it cools, becoming quite black and thick.

The mixture is then purified, as follows:

To one part of the mixture I add one part muriatic acid and boil it a few minutes, and filter it, and after this I wash it in warm water and then dry it. The washing process is easily done, as the mixture is insoluble in water.

I then dissolve the dry mixture in alcohol, with about twenty per cent. of sulphuric acid, and afterwards boil it a few minutes in a water-bath and pass it through a filter. The dye is then ready for use, the material to be colored being dipped into the dye and manipulated as usual.

By changing or varying the proportion of the aniline-oil and arsenic acid, different shades of gray may be obtained. For instance, if the properties are used as given above, a pure gray dye is obtained. To obtain a light gray and a felt gray, the proportion of arsenic acid is increased, and the proportion of arsenic acid decreased to obtain a bluish and a reddish gray.

I would remark that the material to be dyed, previous to being dipped, is washed in warm water acidulated more or less with sulphuric acid.

Having thus described my invention, I claim as new, and desire to secure by Letters Patent—

A dye, composed of the ingredients herein named, and treated in the manner substantially as set forth.

B. BLOCH.

Witnesses:
WM. F. McNAMARA,
ALEX. F. ROBERTS.